Patented June 6, 1939

2,161,245

UNITED STATES PATENT OFFICE 2,161,245

PROCESS OF LOWERING SULPHUR VISCOSITY AND RESULTING NONVISCOUS SULPHUR COMPOUND

Gordon A. Cain and John B. Chatelain, Freeport, Tex., assignors to Freeport Sulphur Company, Freeport, Tex., a corporation of Delaware No Drawing. Application December 4, 1937, Serial No. 178,068

4 Claims. (Cl. 255—1)

This invention relates to a process of lowering the melting point of sulphur and reducing the viscosity of the same when molten, to the resulting non-viscous sulphur compound or compounds, and to a method of using a non-viscous sulphur compound.

The invention has for its main object the provision of a process of the character indicated which is accomplished by admixing with sulphur relatively small amounts of certain substances which may be readily added to sulphur and are relatively inexpensive.

Another object is to provide sulphur compounds which have relatively low viscosity at temperatures above 320° F. while retaining other properties of pure sulphur for application in the arts.

Still another object is to provide a method of using a sulphur compound with a non-viscous characteristic in the drilling of wells by the rotary method so that aqueous muds, heretofore employed, may be replaced with a sulphur drilling fluid.

It is well known that when ordinary sulphur is melted, it is a liquid with a viscosity approximately the same as that of a light lubricating oil. However, when the temperature of liquid sulphur is increased to about 320° F. the viscosity increases very rapidly and from this temperature to about 650° F. sulphur is very viscous. For example, the viscosity of liquid or molten sulphur, as compared with water at 68° F., is about 10 at 250° F.; about 80 at 315° F.; about 50,000 at 340° F.; and about 52,000 at 360° F. The temperature range over which this exceptionally high viscosity occurs is somewhat variable and is affected by the presence of small amounts of various impurities in the sulphur. The range over which sulphur has an exceptionally high viscosity will hereinafter be referred to as "the viscous range".

It has long been recognized that this high viscosity above 320° F. limits the uses of sulphur, and causes considerable inconvenience in handling liquid or molten sulphur. This high viscosity makes it impractical to pump, pour, stir, or carry out any similar operation on sulphur in this viscous range. This is particularly disadvantageous when it is desired to pump liquid sulphur for long distances without reheating. Since ordinary sulphur must be pumped at temperatures below 310° F. and the melting point of sulphur is about 240° F. the heat losses while pumping are likely to cause the sulphur to freeze in the lines.

Another example of a case where it is desirable to lower the viscosity of sulphur at elevated temperatures is when it is desired to cause liquid or molten sulphur to react with some compound or element. With ordinary sulphur these reactions must be made to take place below the viscous range, or if it is necessary to have the reaction take place about 320° F. considerable difficulty is experienced in stirring and mixing the sulphur and the reacting compound.

Moreover it has been proposed to use liquid or molten sulphur as a substitute for the drilling mud used in the rotary method of drilling wells for oil, gas, and the like. The ordinary methods of rotary drilling using an aqueous mud have numerous disadvantages. Among those may be mentioned the difficulty which is experienced when drilling through the anhydrous shale formations commonly referred to as "heaving shale" by reason of its characteristic swelling and subsequent "heaving" which results when the shale comes in contact with the water in the drilling mud. Another disadvantage is that experienced when drilling in ordinary formations where it frequently happens that the aqueous drilling mud does not have enough strength to keep the sides of the hole from caving in.

These advantages could all be avoided if it were feasible to substitute sulphur for the aqueous drilling mud. Numerous additional advantages would also follow. One of these would be the elimination of any reaction between the liquid sulphur and the anhydrous shale that would cause swelling or "heaving" of the shale. Another would be the solidification, when drilling, of a part of the liquid sulphur by cooling on the sides of the hole. This solidified sulphur, in such instance, would form a strong casing on the inside of the hole drilled that would prevent the sides of the hole from caving in and would make it unnecessary to set metallic casing in the hole as often as by the old method. In addition, the metallic casing set would be protected from corrosion by the solidified sulphur and such sulphur would act as a cement that would make unnecessary and avoid the expense of cementing the casing with Portland cement, as is done in the old practice. However, in spite of the many advantages of using sulphur as a drilling fluid, both in the decreased cost of drilling and in the possibility of obtaining new and greater mineral resources by drilling through heaving shale, it has not been practical to use sulphur in this connection. This is due very largely to the fact that ordinary sulphur cannot be pumped above 310° F. except with extreme difficulty and at great expense. To pump pure liquid sulphur in a manner commercially feasible it is necessary to pump it into a well below this temperature. Since this temperature is only about 70° F. above the melting or freezing point of sulphur the unavoidable heat losses in the well would invariably cause the sulphur to cool and freeze in the well. This makes it impractical to circulate pure liquid sulphur in a well and has rendered all previous methods so proposed inoperative.

In the practice of the present invention, sulphur is treated in a manner and a sulphur compound produced such that the product will have a melting point lower than that of ordinary sulphur and will have a comparatively low viscosity at temperatures as high as 500° F. By using this treated sulphur and pumping it into a well at a temperature as high as 500° F. it is possible to eliminate substantially completely the liability of sulphur freezing in the well.

It has previously been known that when ammonia, iodine, or hydrogen sulphide is added to molten sulphur a decrease in the viscosity of the sulphur in the viscous range will result. It has also been known that sulphur containing oil on being heated to the temperature at which sulphur is normally viscous will have a viscosity lower than that of ordinary sulphur. This can be attributed to the reaction between the oil and sulphur at the elevated temperature to produce hydrogen sulphide which lowers the viscosity of the sulphur.

The knowledge of such methods of lowering the viscosity of sulphur in the viscous range, while it has been available for years, has not hitherto led anyone to make use of the same for the purpose of lowering the viscosity of sulphur when pumping, pouring or stirring molten sulphur, or to substitute sulphur as the drilling fluid when drilling wells by the rotary drilling method. As pointed out above, while the process of drilling wells by the rotary drilling method using molten sulphur as a drilling fluid has been already suggested, such suggestion has been heretofore abandoned because of the high viscosity of sulphur in the viscous range. It is here proposed, however, to practice a step of lowering the viscosity of sulphur in the viscous range in the rotary drilling method with the result that a workable method using sulphur as the drilling fluid is obtained. The combination is new and unique and accomplishes a result not possible before and that has been needed in the well drilling industry.

In addition to the substances mentioned above, it has been ascertained that there are certain other substances or agents which may be added to sulphur in relatively small amounts, the amount being such as to reduce the viscosity of sulphur at high temperatures while retaining the characteristics of elemental sulphur, and which are more readily admixed than gases and are relatively inexpensive. These other substances constitute an empirical class comprising the following compounds: Organic sulphides, arsenic sulphides, phosphorus sulphides, antimony sulphides, lead sulphide, cadmium sulphide, bismuth sulphide, zinc sulphide, ammonium sulphides, alkali sulphides, alkali earth sulphides, naphthalene, anthracene, phenanthrene, vinyl polymers, e. g., vinyl acetate, chloride and the like combinations per se and in admixture formaldehyde polymers, e. g., formaldehyde combinations with a phenol, an urea, a thiourea and others, and olefine polysulphide polymers, as the ethylene, propylene and butylene sulphides, such for example that sold under the trade name "Thiokol".

If a substance be added to sulphur that will react with the sulphur to produce one of the above-named treating agents, the desired lowering of the melting point of sulphur and reduction of vsicosity of sulphur when molten may also be accomplished. As examples of such reacting substances may be mentioned metallic arsenic, antimony, lead, yellow and red phosphorus, or the oxides of the same. Such reacting agent when added to sulphur produces an arsenic sulphide, a phosphorus sulphide, etc., as the case may be. Again, if an olefine hydrocarbon be added to sulphur, it will react with the sulphur to produce an olefine polysulphide in the sulphur. It will be understood, therefore, wherever in this specification an agent from the class of the above-named treating compounds is mentioned, those substances which will react with sulphur to give the agent, or wherever the word "sulphide" is used the corresponding hydrosulphides and polysulphides, are intended to be included.

The following are given as illustrative examples of the process of producing non-viscous sulphur compounds in accordance with the invention:

*Example I*

| | Per cent |
|---|---|
| Sulphur | 98 |
| Organic sulphide | 2 |

*Example II*

| | Per cent |
|---|---|
| Sulphur | 98.5 |
| Arsenic sulphide | 1.5 |

*Example III*

| | Per cent |
|---|---|
| Sulphur | 98.25 |
| Potassium sulphide | 1.75 |

*Example IV*

| | Per cent |
|---|---|
| Sulphur | 99 |
| Metallic arsenic | 1 |

*Example V*

| | Per cent |
|---|---|
| Sulphur | 96 to 90 |
| Naphthalene | 4 to 10 |

*Example VI*

| | Per cent |
|---|---|
| Sulphur | 97 |
| Formaldehyde polymer | 3 |

*Example VII*

As a first step, there is added to the sulphur intended for use as drilling fluid, an amount, preferably in excess of a tenth of one percent of the sulphur by weight, of the olefine polysulphide polymer, known by the trade name "Thiokol". This will produce a mixture that has a lower melting point than ordinary sulphur and, at temperatures between the melting point and the viscous range of sulphur, has a viscosity only slightly higher than that of ordinary sulphur. However, at the temperature at which the viscosity of ordinary sulphur increases several thousand times the viscosity of the sulphur-olefine polysulphide polymer mixture has only a small increase in viscosity. Continued heating of this mixture will effect a reduction in viscosity. The exact amount of the olefine polysulphide polymer to be added depends on the extent to which it is desired to lower the viscosity and the extent to which it is permissible to modify the properties of the sulphur by addition of such polymer. The addition of 2% of this polymer to sulphur produces a mixture that has a relatively low viscosity at high temperatures and still retains most of the properties of pure sulphur.

After the sulphur drilling fluid is prepared, the pumping and drilling steps are practiced in substantially the same manner as when an aqueous mud is used.

The use of an agent from the class of treating agents here disclosed has the advantage over the use of ammonia, hydrogen sulphide, or iodine in that all of these agents are relatively inexpensive solids or liquids in addition to their being much easier to add to the sulphur than gases, such as ammonia and hydrogen sulphide and are less expensive than iodine.

No special equipment is necessary for the practice of the steps of the present invention. The treating agent can be added to the sulphur when desired; for example, it may be mixed with the sulphur in the solid state before melting, or it may be added to liquid sulphur after melting. Any conventional means for mixing may be employed that will give reasonable dispersion of the treating agent in the sulphur.

The primary purpose in practicing the invention is the obtaining of a lowering of the melting point and a decreasing of the viscosity of sulphur in the temperature range known as the viscous range. While a number of the treating agents named do lower the viscosity of liquid sulphur at all temperatures, it is not desired to have the claims of this patent limited by the fact that a few of the treating agents do not lower the viscosity of sulphur, except in the temperature range known as the viscous range.

Since certain changes may be made in carrying out the above process without departing from the scope of the invention, it is intended that all matter contained in the above description shall be interpreted as illustrative and not in a limiting sense.

Having described our invention, what we claim as new and desire to secure by Letters Patent is:

1. A method of drilling wells which comprises preparing a drilling fluid which contains molten sulphur and an admixture in excess of one-tenth of one per cent. of an olefine polysulphide polymer, whereby the viscosity of the sulphur is greatly reduced at temperature in excess of 320° F., then drilling and pumping the prepared drilling fluid into the bore being drilled.

2. A method of drilling wells which comprises preparing a drilling fluid which contains molten sulphur and a relatively small amount of a relatively easily introduced treating agent which is chosen from the empirical class that consists of naphthalene, anthracene, and phenanthrene, then drilling and pumping the prepared drilling fluid into the bore being drilled.

3. A method of drilling wells which comprises preparing a drilling fluid which contains molten sulphur and a relatively small amount of a relatively easily introduced treating agent which is chosen from the empirical class that consists of olefine polysulphide polymers, vinyl polymers, formaldehyde polymers, their hydrosulphides and polysulphides, then drilling and pumping the prepared drilling fluid into the bore being drilled.

4. A method of drilling wells which comprises preparing a drilling fluid of molten sulphur, reducing the viscosity of the molten sulphur in the fluid by the addition of a relatively small amount of a relatively easily introduced substance which lowers the melting point of sulphur, then drilling and pumping the prepared drilling fluid into the bore being drilled.

G. A. CAIN.
J. B. CHATELAIN.

CERTIFICATE OF CORRECTION.

Patent No. 2,161,245. June 6, 1939.

GORDON A. CAIN, ET AL.

It is hereby certified that error appears in the printed specification of the above numbered patent requiring correction as follows: Page 1, second column, line 26, for the word "advantages" read disadvantages; page 3, second column, line 11, claim 1, for "temperature" read temperatures; and that the said Letters Patent should be read with this correction therein that the same may conform to the record of the case in the Patent Office.

Signed and sealed this 11th day of July, A. D. 1939.

(Seal) Henry Van Arsdale
Acting Commissioner of Patents.